(12) United States Patent
Smilowitz et al.

(10) Patent No.: US 11,709,859 B2
(45) Date of Patent: *Jul. 25, 2023

(54) SYSTEMS AND METHODS FOR ENABLING SITUATIONAL AWARENESS FOR EVENTS VIA DATA VISUALIZATION

(71) Applicant: Northwestern University, Evanston, IL (US)

(72) Inventors: Karen R. Smilowitz, Evanston, IL (US); George T. Chiampas, Wilmette, IL (US); Taylor G. Hanken, Chicago, IL (US); Rachel G. Lin, Evanston, IL (US); Ryan W. Rose, Evanston, IL (US); Bruno P. Velazquez, Evanston, IL (US); Samuel H. Young, Evanston, IL (US)

(73) Assignee: Northwestern University, Evanston, IL (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/526,149

(22) Filed: Nov. 15, 2021

(65) Prior Publication Data
US 2022/0075797 A1 Mar. 10, 2022

Related U.S. Application Data

(63) Continuation of application No. 15/478,033, filed on Apr. 3, 2017, now Pat. No. 11,194,834.
(Continued)

(51) Int. Cl.
| | | |
|---|---|---|
| *G06F 16/26* | (2019.01) | |
| *G06N 3/006* | (2023.01) | |
| *G06F 3/048* | (2013.01) | |
| *G06N 5/02* | (2023.01) | |

(Continued)

(52) U.S. Cl.
CPC ............. *G06F 16/26* (2019.01); *G06F 3/048* (2013.01); *G06N 3/006* (2013.01); *G06N 5/02* (2013.01);
(Continued)

(58) Field of Classification Search
CPC ......... G06F 16/26; G06F 3/048; G06N 3/006; G06N 5/02; G06Q 10/04; G06Q 10/06; G06T 17/05; H04L 67/535
See application file for complete search history.

(56) References Cited

U.S. PATENT DOCUMENTS

| | | |
|---|---|---|
| 6,704,015 B1 | 3/2004 | Bovarnick et al. |
| D553,629 S | 10/2007 | Blencowe |

(Continued)

FOREIGN PATENT DOCUMENTS

WO 2004104961 A1 12/2004

OTHER PUBLICATIONS

Hourdakis et al., "Practical Procedure for Calibrating Microscopic Traffic Simulation Models", Transportation Research Record 1852, Paper No. 03-4167, pp. 130-139, Jan. 1, 2003.
Glenn I. Hawe et al. "Agent-Based Simulation for Large-Scale Emergency Response: A Survey of Usage and Implementation," ACM Comput., Surv. 45,1, Article 8 (Nov. 2012), 51 pages.

*Primary Examiner* — Brent Johnston Hoover
(74) *Attorney, Agent, or Firm* — Banner & Witcoff, Ltd.

(57) ABSTRACT

Aspects of the present disclosure relate to data visualization, and more specifically, to technology that automatically visualizes various analytics and predictions generated for mass participation endurance events, or other mass participation events of interest.

20 Claims, 6 Drawing Sheets

Related U.S. Application Data

(60) Provisional application No. 62/317,073, filed on Apr. 1, 2016.

(51) Int. Cl.
    *G06Q 10/04* (2023.01)
    *G06Q 10/06* (2023.01)
    *G06T 17/05* (2011.01)
    *H04L 67/50* (2022.01)

(52) U.S. Cl.
    CPC ............ *G06Q 10/04* (2013.01); *G06Q 10/06* (2013.01); *G06T 17/05* (2013.01); *H04L 67/535* (2022.05)

(56) References Cited

U.S. PATENT DOCUMENTS

| | | |
|---|---|---|
| D605,652 S | 12/2009 | Plaisted et al. |
| D777,177 S | 1/2017 | Chen et al. |
| 2012/0143576 A1* | 6/2012 | Klein .................... G06V 20/54 703/6 |
| 2013/0271457 A1 | 10/2013 | Haswell et al. |
| 2014/0359524 A1 | 12/2014 | Sasaki et al. |
| 2015/0143248 A1 | 5/2015 | Beechuk et al. |
| 2015/0379048 A1 | 12/2015 | Raghavan et al. |
| 2016/0117059 A1 | 4/2016 | Folken et al. |
| 2017/0185904 A1 | 6/2017 | Padmanabhan et al. |

\* cited by examiner under both normal operating conditions and in the event of an emergency, or other type of catastrophic event.

SYSTEMS AND METHODS FOR ENABLING SITUATIONAL AWARENESS FOR EVENTS VIA DATA VISUALIZATION

CROSS-REFERENCE TO RELATED APPLICATIONS

This Application is a Continuation of U.S. patent application Ser. No. 15/478,033 filed on Apr. 3, 2017, which claims the benefit of U.S. Provisional Application No. 62/317,073 filed on Apr. 1, 2016, each of which is incorporated by reference in its entirety herein.

STATEMENT REGARDING FEDERALLY SPONSORED RESEARCH OR DEVELOPMENT

This invention was made with government support under CMM11405231 and CMM11458000 awarded by the National Science Foundation. The government has certain rights in the invention.

TECHNICAL FIELD

Aspects of the present disclosure relate to computing systems that automatically simulate and visualize various aspects of a mass participation endurance events or other events of interest.

BACKGROUND

Mass participation events, such as marathons, often pose public safety risks to do the high volume of engaged participants. For example, hundreds of marathons are organized worldwide ever year and most have thousands of people participating in some type of active capacity, such as running, walking, spectating, volunteering, etc. Real-time management, monitoring, and tracking of participants and associated resources in such events is crucial for event organizers, both under normal operating conditions and in the event of an emergency, or other type of catastrophic event.

It is with these concepts in mind, among others, that various aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
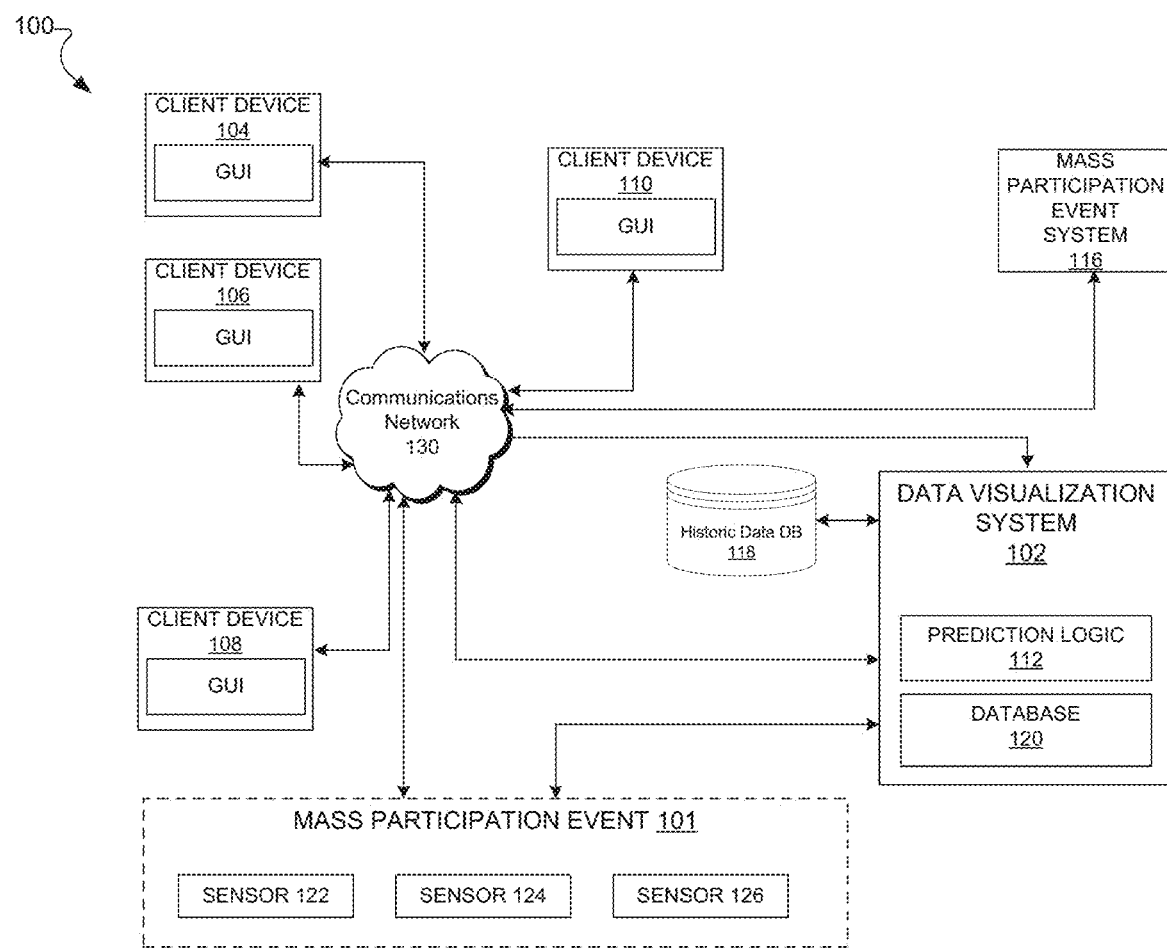
FIG. 1 is a block diagram illustrating a computing network for monitoring, aggregating, and visualizing information for mass participation events, according to aspects of the present disclosure.

Aspects of the present disclosure involve a dynamic data visualization system that automatically monitors (e.g., in real-time) the flow of participants and resources involved in a mass participation event, such as a marathon, or other event of interest. In various embodiments, the data visualization system, dynamically and in real-time, receives data and information corresponding to the mass participation event and automatically visualizes the data by generating one or more interactive graphical user interfaces for display, such as at one or more client devices deployed within a communications network. The data visualization system also includes prediction logic (e.g., one or more prediction algorithms) that automatically predicts (e.g., generates one or more analytics) and/or otherwise automatically simulates behavior patterns for participants of the mass participation event, any of which may also be displayed within the interactive graphical user-interfaces.

In other aspects, the data visualization system may be employed to provide useful information (e.g., predictions, metrics, and notifications) to organizers and/or administrators of the mass participation event, under both normal operating event circumstances and in circumstances representative of an emergency. For example, in the context of a marathon, organizers are typically responsible for overseeing the wellness of thousands of participants, as well as manage the individuals and resources involved with medical aid and/or other event resources, and/or the like. In such a context, the prediction logic of the data visualization system may be used to simulate participant density along the marathon path, and predict the location of participants at a future point in time. Additionally, the prediction logic may be able to predict the demand and consumption of various resources required by such participants. The predictions are validated with real-item mass participation event data, which once validated, is passed to the prediction logic for continuous (e.g., real-time) refinement. Any of the real-time data may be used to dynamically drive the generated graphical-user interfaces.

In yet other aspects, the present application describes a specific computing system(s), architecture, and/or computing environment that may be used to solve specific problems faced by typical computing systems involved in the management and automation of mass participation events. For example, typical computing systems and environments used in mass participation events face large system load times due to poor bandwidth and network connectivity during events, causing the system to face huge system delay and data latency issues when attempting to load new data from external resources, all of which causes users of such existing systems to receive data late (i.e., users could not immediately obtain critical information and data from the system). Moreover, typical computing systems involved in the monitoring of mass participation events attempt to determine the location of participants (e.g., runners in a marathon) based on static and historic location data maintained at external computing systems (e.g., GPS data). Again, due to limited network connectivity, accessing such data may be limited.

Finally, typical computing systems involved in mass participation events generate simulations based on limited and outdated event data using simulation algorithms that are static and which cannot be modified in any manner without an exhaustive redesign of the system.

The system architecture and/or computing environment disclosed in the present application allows for fast and seamless data updates to enable real-time data visualization during a mass participant event. In some instances, unique data streams are established for each type of information or data (weather, medical, participant, environment, course information, etc.) processed by the system, causing the system to not have to process and parse the various types or pieces of data from multiple streams, thereby reducing latency and delay. Additionally, the system and methods disclosed herein use prediction logic (e.g., machine-learning mechanisms) that process mass participation event data and traffic to simulate various aspects of the event, such as simulating runners participating in a marathon. The simulated aspects (e.g., the simulation data) is processed to verify that the simulation is accurate, and when determined accurate, the simulation data is automatically provided to the prediction logic of the system to continuously refine the prediction capabilities of the system, resulting in more precise and meaningful predictions.

The present application uses marathons as an example to illustrate the various concepts set out herein. The present application, however, is not limited to marathons, and is applicable to other mass participation events of interest, such as concerts, festivals, conventions, mass police responses, and/or the like.

FIG. 1 illustrates a computing network 100 capable of monitoring, aggregating, and visualizing information corresponding to a mass participation event, according to one embodiment. The computing network 100 may be an IP-based telecommunications network, the Internet, an intranet, a local area network, a wireless local network, a content distribution network, or any other type of communications network, as well as combinations of networks.

As illustrated, the computing network 100 includes a data visualization system 102, which may be a processing device that functionally connects (e.g., using communications network 100) to one or more client devices 104-110 included within the computing network 100. A user interested in monitoring a mass participation event may interact with one or more client device(s) 104-110 to initiate a request, which may be received by data visualization system 102. More particularly, the one or more client device(s) 104-110 may also include a user interface, such as a browser application, to generate a request for monitoring mass participation events, such as for example in real-time. In response, the data visualization system 102 may transmit instructions that may be processed and/or executed to generate various visualizations and/or simulations corresponding to the mass participation event (e.g., a marathon). The one or more client devices 104-110 may be any of, or any combination of, a personal computer; handheld computer; mobile phone; digital assistant; smart phone; server; application; and the like. In one embodiment, each of the one or more client devices 104-110 may include a processor-based platform that operates on any suitable operating system, such as Microsoft® Windows®, Linux®, and/or the like that is capable of executing software.

In some embodiments, the visualization system 102 may automatically obtain and process operational data corresponding to the mass participation event. The operational data obtained by the data visualization system 102 may include, but is not limited to: data describing resources of the mass participation event; participant demographic and characteristic information; geographic and/or weather information of the mass participation event; among other information. In some embodiments, the data visualization platform 102 may include or be connected with a database 120, which may be a general repository of operational data (both historic and real-time) corresponding to a mass participation event. The database 120 may include memory and one or more processors or processing systems to receive, process, query and transmit communications and store and retrieve such data. In another aspect, the database 120 may be a database server. In one specific example, the data visualization system may archive data in the database 120 or some other type of data storage (e.g., remotely located) during a mass participation event, such as a marathon. Typical mass participation event systems overwrite data when the system updates. The system of the present application archives the data so that the archived data may be used to train the system when generating mass participation analytics and predictions.

In one specific embodiment, the data visualization system 102 may functionally communicate with one or more data sensors 122-126 physically located within the mass participation event to obtain operational data corresponding to participants of the mass participation event. For example, it is common in a marathon to have a series of timing mats that include an processor and antenna or other types of communication devices capable of recognizing signals from participant (e.g., a participant in a marathon may have a timing chip) and/or transmitting data, such as when a runner steps on the mat, the runner's chip is recognized by the timing mat, which in turn records data about the runner.

Figure 2:
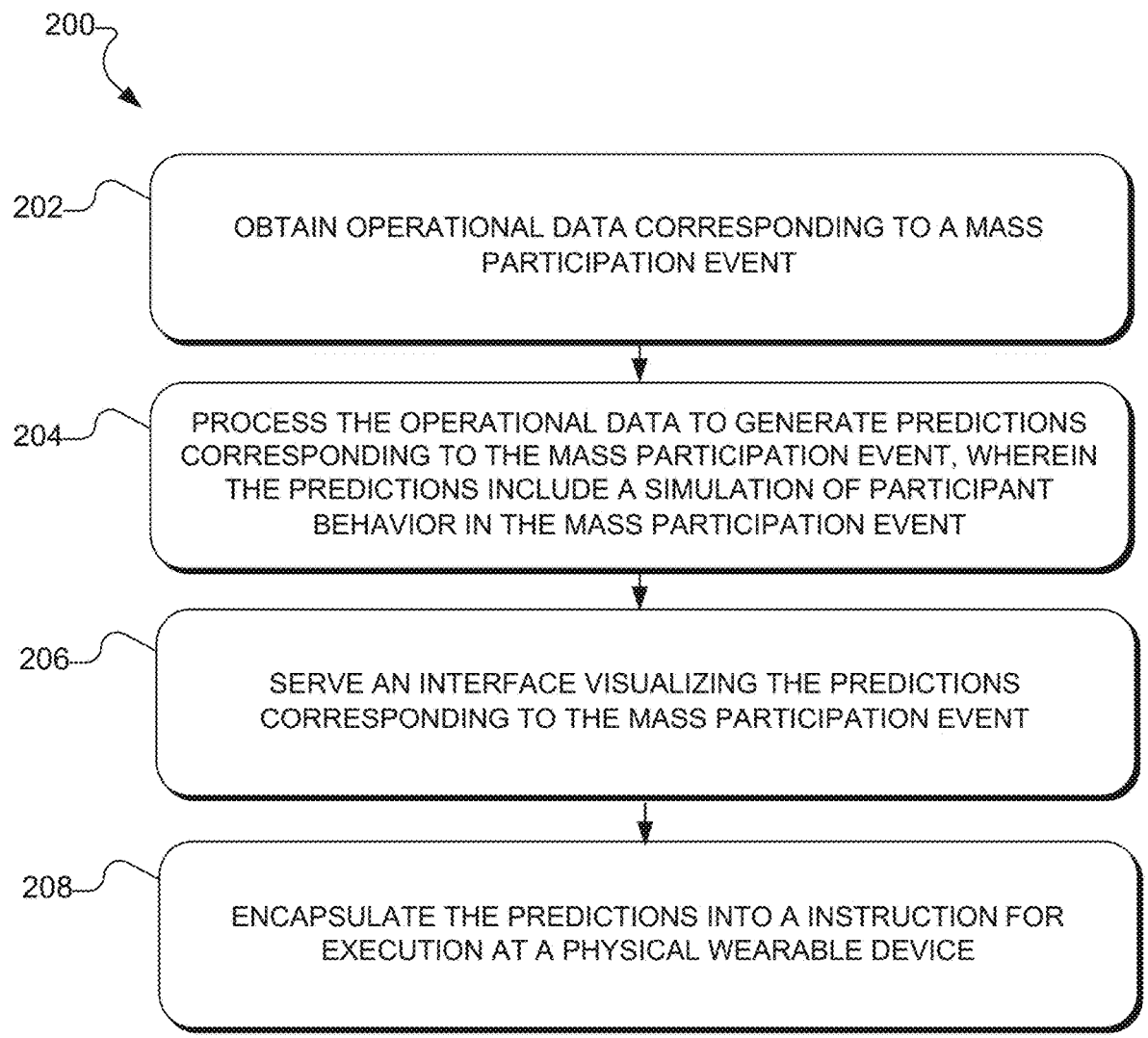
FIG. 2 is a flowchart illustrating an example process monitoring, aggregating, and visualizing information for mass participation events, according to aspects of the present disclosure.

Referring now to FIG. 2 and with reference to FIG. 1, an illustrative process 200 for monitoring, aggregating, simulating, and visualizing information for mass participation events is provided. As illustrated, initially, operational data may be collected and/or otherwise received at the data visualization system 102 that corresponds to a mass participation event (operation 202). In one particular embodiment, the operational data may be obtained by automatically receiving or otherwise accessing data from existing mass participation event systems 116 or databases and/or other data sources (e.g., historic operational data) associated with previous mass participation events (illustrated in FIG. 1 at 116 and 118). For example, if the mass participation event were a marathon, the mass participation event system 116 may represent any computing system capable of storing data corresponding to a marathon. Such data may include data indicating the start time of the marathon, end time, start location, end location, weather, runner location, medical station location, and the like. In another embodiment, such data may include data describing the behavior of a participant in the mass participation event or a group of participants in the mass participation event. Thus, if the event were a marathon, the data may describe various behaviors of runners, such as speed, start and stop points, clustering of groups of runners, and/or the like.

In one specific embodiment, the operational data may be received into the data visualization system 102 as one or more unique data streams corresponding to specific aspects of the mass participation event. For example, and in the context of a marathon, the unique data streams may include a stream corresponding to course data, runner demographic data, runner time data, health data, and weather data. An analysis of such data streams may result in the identification of various metrics and analytics that may be visualized and/or displayed at the one or more client devices 104-110. For example, an analysis of medical data may indicate that a demand for medical care increases during peak mass event participation times, and further, that a specific type of medical issues predominates during such times. Additionally, the health data may indicate the medical need at different medical station locations at different times of the race. Having such analytics expands the potential to analyze health data not only by care type, patient volume and length of stay, but also with respect to the geographic and temporal understanding of medical needs along the course.

In some instances, the obtained data streams (e.g., the data of the data streams) may be fragmented. Thus, the data visualization system 102 may automatically merge the various data streams to into a single data stream, or otherwise identify meaningful data variables that are consistent between one or more of the unique data streams. More specifically, the prediction logic 112 may automatically identify the presence of robust variables (e.g. time stamps, weather data specificity), the potential for missing data values (e.g. medical diagnosis), and determine the reliability and accuracy of such variables over time.

Referring again to FIG. 2, the obtained operational data is used to generate various aggregations, analytics, and/or predictions corresponding to the mass participation event, and in one specific example, to generate a simulation of participants in the mass participation event (operation 204). Referring to FIG. 1, a prediction logic component 112 of the data visualization system 102 may execute various algorithms (e.g., machine-learning) and/or processes that generate a simulation that predicts and/or otherwise models various aspects of the mass participation event and the behavior of participants in the mass participation event. In some embodiments, the predictions and simulations may be generated for a particular time period and initially may be based on historical operational data corresponding to past time periods sharing common characteristics (e.g., demographics of participants, number of participants, health concerns of participants, weather conditions, geographic location, event preparations) with the specified time period. Stated differently, the first simulation may be executed based on historic data, while subsequent simulations may be based on real-time operational data obtained during the event, as explained in detail below. Accordingly, in one specific embodiment and in the context of a marathon, the prediction logic component 112 of the data visualization system 102 may automatically generate a simulation of runners participating in the marathon, before the actual marathon event occurs in real-time. Stated differently, the prediction logic 112 may generate a simulation of the marathon that includes predictions of the participants running behavior during the marathon, even though the marathon has not officially begun.

An illustrative example of generating a simulation will now be provided. Assume a series of health care providers are interested in preparing for a marathon event by making sure the correct amount or medical resources are displaced at medical supply areas throughout the marathon course or path. At some locations, a larger amount of medical supplies and resources may be required due to larger runner participant density and injury. To identify such locations, the system may initiate a simulation of the marathon, wherein the simulation includes predictions of the speed and location of individual runners, or groups of runners. Based on the simulation, the system can predict or otherwise determine specific medical supply areas and a corresponding specific amount of medical supplies that should be allocated to the identified specific areas. To ensure that the prediction system is generating accurate simulations and predictions, the system may monitor and capture real-time operational data occurring during the live marathon event and compare the simulated data to the real-time data, to ensure that system is properly trained to make accurate marathon simulations.

Figure 3:
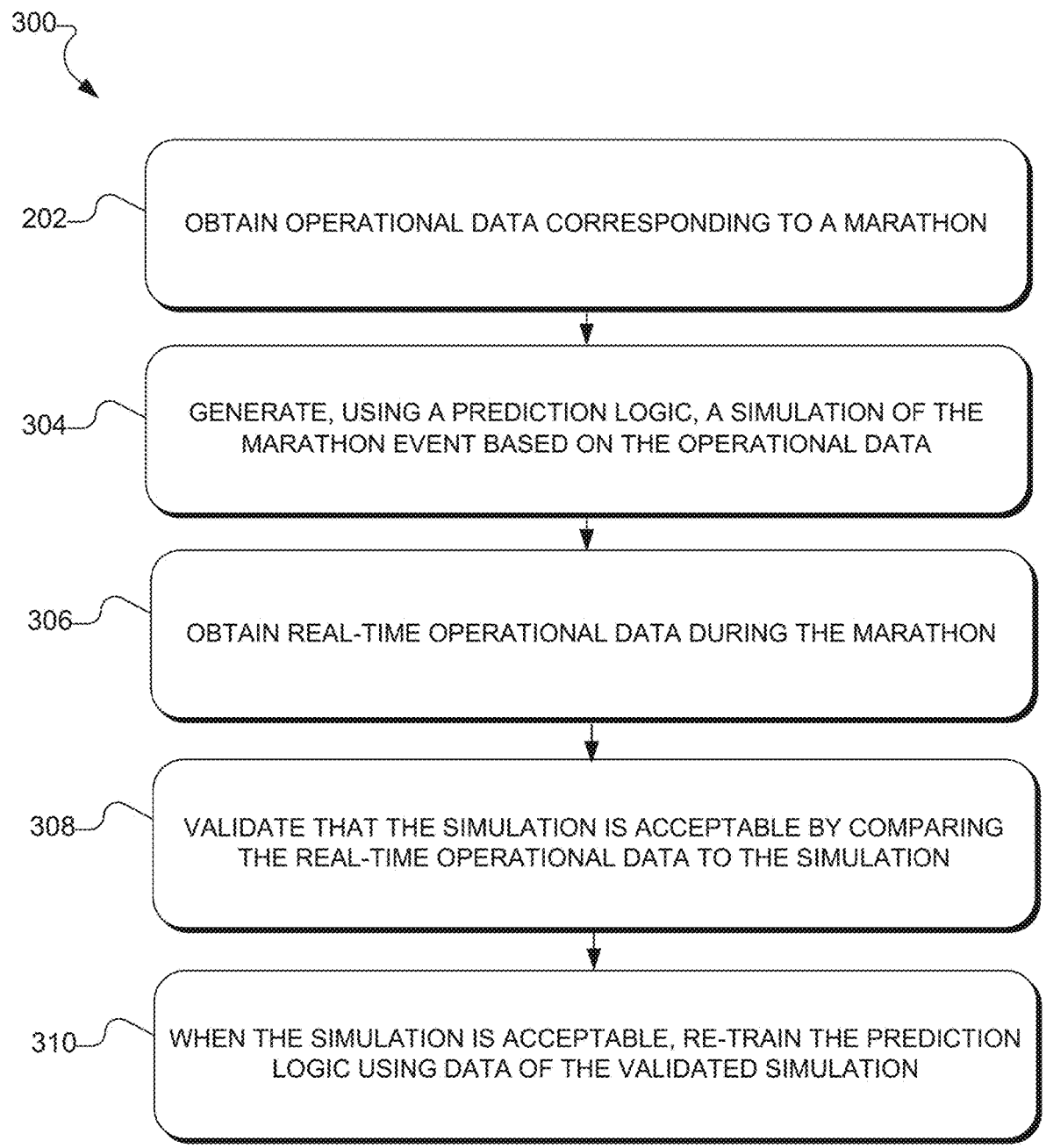
FIG. 3 is a flowchart illustrating an example process for simulating participation in a marathon, according to aspects of the present disclosure.

FIG. 3 provides a process and/or method 300 for simulating runners participating in a marathon, according to one embodiment. As illustrated, the process begins with obtaining operational data corresponding to the marathon, as described above with respect to FIG. 2. Based on the obtained operational data, a simulation of the marathon is initiated and/or executed (operation 304). In one specific example and referring to FIG. 1, the prediction logic 112 may calculate or otherwise execute the following algorithms to during the simulation:

Participant Density Function at a Marathon:

The participant density function (referred to herein as "runner density function") predicts where runners are given a time, temperature, and starting times. In some embodiments, the data visualization system 102 may automatically decide on a speed multiplier ratio (used to reflect race-day conditions), where a reduced number of 'simulated' runners are created (merely for increased speed, but could be 1:1), each of which include the characteristics of real runners (speed functions, corral, start times, temperature factor). The data visualization system 102 may further virtually place each runner in a corral and assign a start time relative to the real runners represented by the simulated runner entity. Generally speaking, a corral represents a sectioned area at the lineup of a race that helps separate runners into different pace groups. The faster an individual is, the more likely he or she will end up in one of the first few corrals. The prediction logic 112 automatically executes instructions that automatically simulates the marathon for a specific period of time, such as five hundred (500) minutes. Each minute, each runner entity has its position, speed, and status in the race (not started, started, finished) updated (i.e., simulated).

Figure 1A:
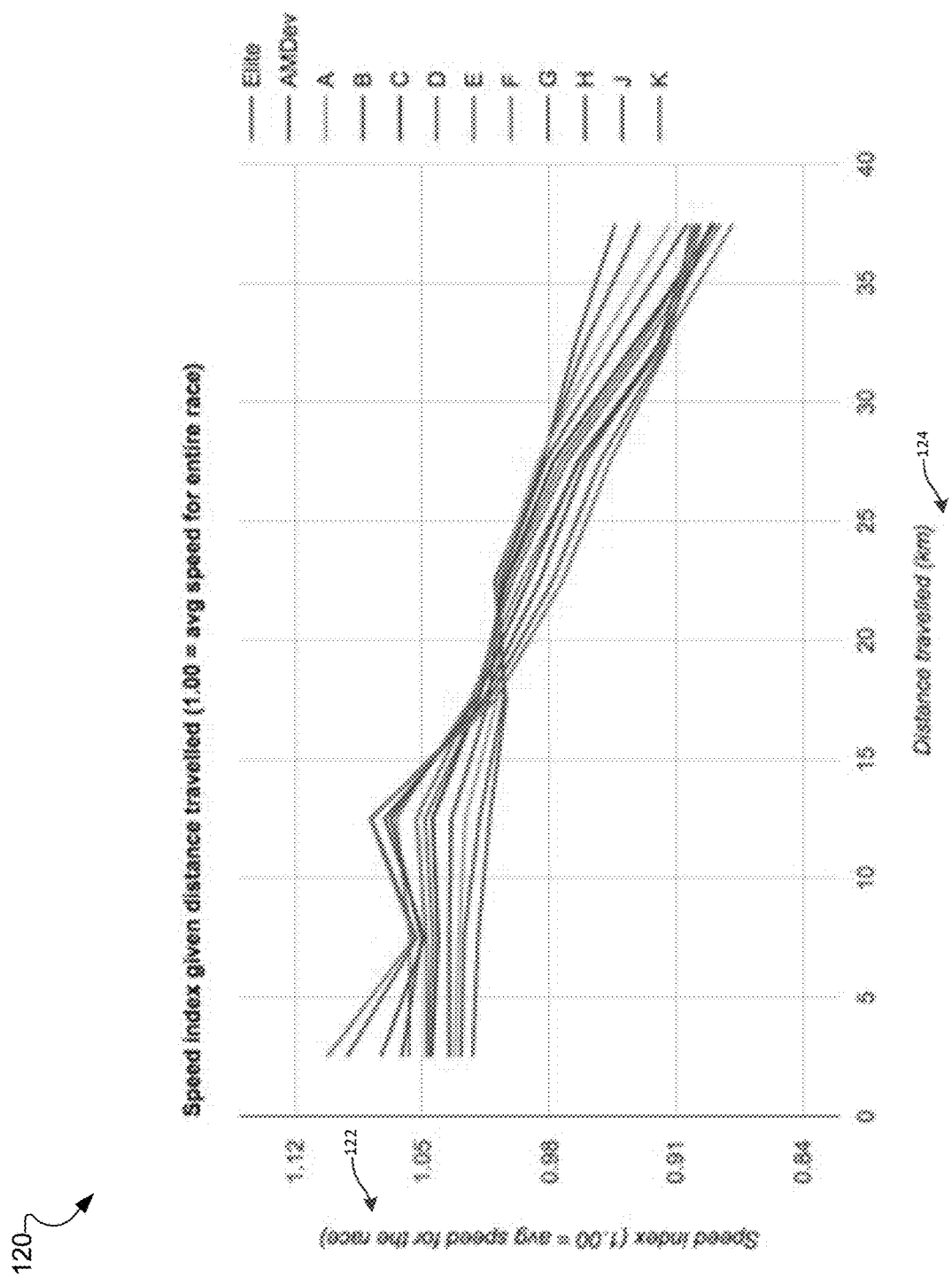
FIGS. 1A-1B are graphs illustrating runner simulations, speed calculations, and correlations, according to aspects of the present disclosure.

Calculate Speed Given Corrals and how to Simulate the Runners:

The prediction logic of the data visualization system 102 may also automatically estimate speed for each simulated runner or for a group of runners. More specifically, based on corrals, the data visualization system 102 generates a prediction of how speed changes for every 5k segment that runners run. Thus, the data may include a set of intervals for every 5k segment in the marathon race. FIG. 1A provides an illustration of a graph 120 showing the change in speed given distance travelled (illustrated at 122), averaged by corral, for a marathon. As illustrated, the speed index (illustrated at 124) for each corral is normalized at the average speed for that corral for the entire race. Therefore, a speed index of 1.15 indicates running at 115% the average speed and an index of 0.9 indicates running at 90% of speed.

As illustrated, the fast corrals start and end closer to their average speed when compared to slow corrals. As an example, the Elite corral (dark blue) starts about 4% faster than average speed, and ends about 5% slower. In contrast, corral K begins almost 10% faster and ends 10% slower than their average speed.

Figure 1B:
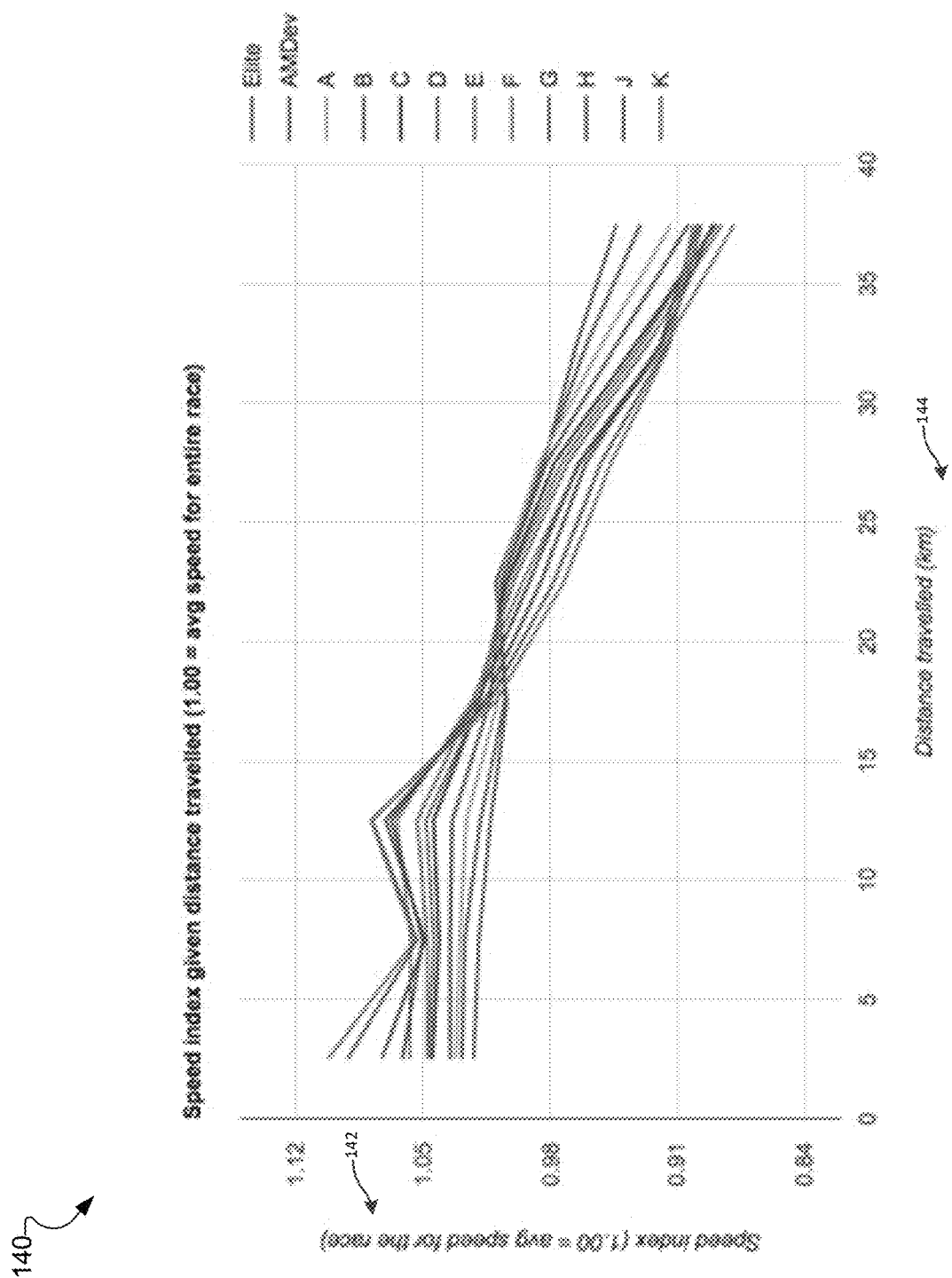

FIG. 1B provides an illustration of a graph 140 showing the relation between temperature and speed. The graph 140 illustrates the speed in miles per hour (illustrated at 142) given position in the marathon (illustrated at 144), for different temperatures, for corral C. Temperatures are taken from the past 7 years, with a range as low as 36 F and as high as 74 F. (NOTE: Since corral assignments changed, participants in corral C are estimated for all years using the historic corral assignments as a basis for calculations)

There is a similar curve with all corrals, and analysis by gender, age category, etc. suggests the same effect: higher temperature both: 1) decreases average speeds; and 2) increases the rate at which speed decreases as the marathon progresses.

Runner Tracking

The prediction logic 112 may obtain input from one or more sensors corresponding to the runner tracking feed contains data input from the timing mats located at each 5 Km ("5K") mark along the race course. The runner tracking feed contains data input. The timing mats record the number of runners crossing each 5K mark. From such information, runner density is estimated in specific segments along the course, such as the stretches between medical aid stations. Since these segments do not correspond to the 5K timing mats, the following equations are used to estimate runner counts, with the following notation for a chosen segment j along the course.

$a_j$: One endpoint of segment j, measured in kilometers from the race start $R(a_j)$: Runners past endpoint of segment j $R^+(a_j)$: Runner count recorded at 5K marker immediately prior to endpoint $a_j$ $R^-(a_j)$: Runner count recorded at 5K marker immediately following endpoint $a_j$ $K^+(a_j)$: 5K marker immediately prior to endpoint $a_j$, measured in kilometers from race start $K^-(a_j)$: 5K marker immediately following endpoint $a_j$, measured in kilometers from race start $$R(a_j)=R^+(a_j)*(1-(a_j-K^+(a_j)/5))+R^-(a_j)*(1-K^-(a_j)-a_j/5))$$

Equation (1) calculates the number of runners past segment endpoint $a_j$ as a combination of the runner counts at the two 5K markers before and after $a_j$, weighted by the relative distances between $a_j$ and these markers.

$$\text{Runners in segment } j = R(a_j) - Rb_j$$

Figure 4:
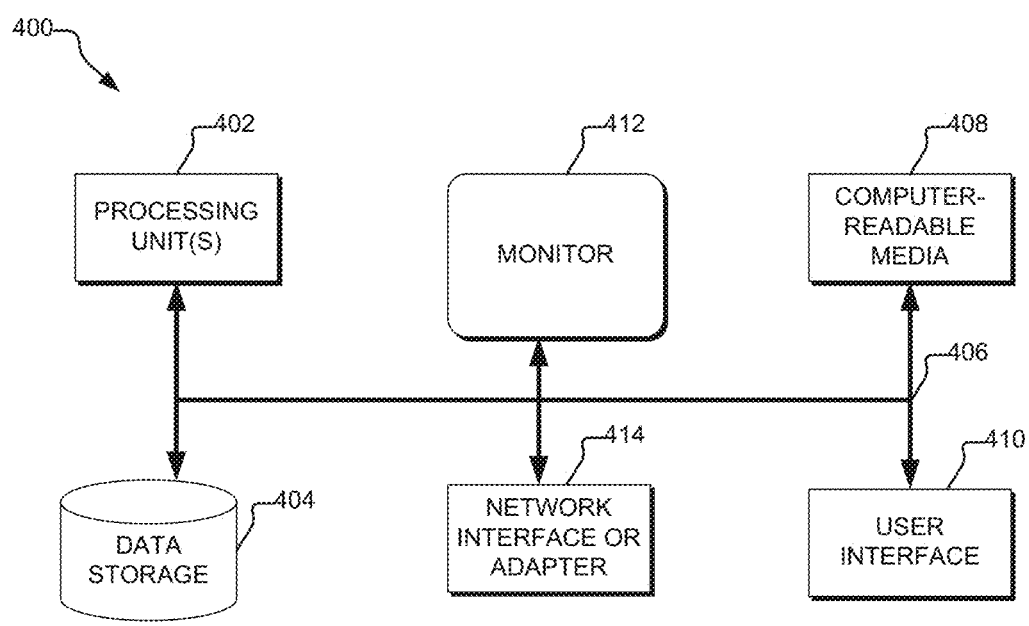
FIG. 4 is a block diagram illustrating a computing device specifically designed and configured for the specific purpose of monitoring and simulating participation in mass participation events, according to aspects of the present disclosure.

Equation (2) calculates the number of runners in segment j by the number of runners passing the start point of the segment minus the volume of runners who passed the end point of the segment. FIG. 4 presents an illustration of the calculation of equations (1) and (2). The density of runners in a segment is obtained by dividing the number of runners in a segment by the length of the segment. Density values are converted to a color code for display as a heat map over the path of the course. The map also displays the percent of runners passing each aid station with equation (1), with the aid station location used for $a_j$.

Referring again to FIG. 3, upon the start of the actual real-world marathon, real-time operational data is captured and monitored by the data visualization system (operation 306). Referring to FIG. 1, the data visualization system 102 automatically captures operational data including: gathering distribution of corrals in percentage and absolute numbers; gathering information on number of runners; gathering real-time information on start times of the race (with a member of the team at the start line); gathering real-time cumulative runner information corresponding to 5 Km segments in the marathon; etc. In one specific embodiment, portions of the real-time operational data are obtained from timing mats (located at each 5 Km mark along the course) to identify the number of runners passing each 5 Km mark over time. Thus, referring to FIG. 1, assuming the mass participation event 101 is a marathon, sensors (equivalent to timing mats) may provide data to the data visualization system 102 indicating the number of runners passing each 5 Km mark, the speed of each runner or a group of runners at the time at which the runner and/or group of runners passes the 5 Km, and the like.

Referring again to FIG. 3, in some embodiments, the simulated data is validated to ensure that the prediction logic is generating simulations that are within an acceptable threshold or range (operation 308). With reference to FIG. 1, the data visualization system 102 may compare the simulated 5 Km intervals to the obtained real-time operational data including 5 Km interval data captured during the marathon. If the comparison satisfies an acceptable threshold (e.g., an exact match of data or with a statistically significant range), then the simulation data is considered acceptable. In such a scenario, the data visualization system 102 may generate an indication that the simulation and/or the simulated intervals are of an acceptable range. Alternatively, when the threshold is not satisfied, the data visualization system 102 may generate and indication that the simulation and/or the simulated interval is not of an acceptable range.

Referring again to FIG. 3, when the simulation and/or the simulation data is validated, the prediction logic is re-trained based on the validated simulation, simulation data, and/or interval data (operation 312). Given the dynamic nature of marathons, the prediction logic 104 may be continuously trained overtime using verified simulation data, simulations, and/or interval data to ensure the prediction logic 112 can generate or otherwise predict more precise and accurate simulations. In some instances, the prediction logic may be trained only by the system automatically adjusting some of the parameters of the participant density function, estimated speed function and/or the runner tracking function, in response to the simulated intervals not being of an acceptable range.

Referring back to FIG. 2, once the simulations, analytics, and/or predictions have been generated, one or more interactive interfaces/input forms (e.g. a user-interface or graphical user-interface (GUI)) may be generated for displaying, in real-time, the generated mass participation event prediction analytics (operation 106). In particular, the prediction logic component 112 may generate interfaces configured to display or otherwise present the one or more parameters, analytics, simulations, and/or the like, that effectively predict and/or otherwise simulate participant behaviors of the mass participation event. The interfaces may include interactive elements, such as buttons, forms, activity logs, fields, selections, inputs, streams, images, etc., charts, for displaying various mass participation event aggregations, analytics, and/or predictions. For example, in one embodiment, one or more web pages may be displayed at the client devices 104-110 that allow users to access the predictions in real-time.

Alternatively, in real-time, the parameters, analytics, simulations and/or the like, of the mass participation event may be encapsulated into a logical instruction for transmission to some type of physical and/or wearable device for notification and use (operation 108). Referring to FIG. 1, the prediction logic 112 may generate the instruction and automatically transmit the instruction to some type of wearable device, such as a clothing and/or other wearable accessories. In other instances, the instruction may be transmitted to another external computing system to initiate a process. For example, an instruction may be transmitted to a health care-related computing system to automatically initiate a health care responder procedure, in response to events occurring in the mass participation event.

FIG. 4 illustrates an example of a suitable computing and networking environment 400 that may be used to implement various aspects of the present disclosure described in FIGS. 1-2. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random-access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure.

References to details of particular embodiments are not intended to limit the scope of the disclosure.

The invention claimed is:

1. A system for visualizing data, the system comprising:
a computing device deployed within a communications network, wherein the computing device is configured to:
use prediction logic to process historical operational data and thereby generate a simulation of physical movement of participants that are physically located at a mass participation event;
receive real-time operational data corresponding to at least the physical movement of the participants during the mass participation event;
based on the simulation and the real-time operational data, verify that the simulation is accurately modeling real-time physical movement of the participants at the mass participation event;
based on verifying the simulation, train the prediction logic using the real-time operational data to obtain refined prediction logic; and
use the refined prediction logic to generate an updated simulation of the physical movement of the participants that are physically located at the mass participation event.

2. The system of claim 1, wherein the computing device is further configured to obtain at least a portion of the real-time operational data from the participants during the mass participation event.

3. The system of claim 1, wherein the computing device is further configured to generate a graphical user interface to display event prediction analytics that predict the physical movement of the participants at the mass participation event.

4. The system of claim 1, wherein the computing device is further configured to receive at least a portion of the real-time operational data from one or more sensors physically located at the mass participation event.

5. The system of claim 1, wherein the computing device is further configured to validate the simulation based on a comparison of simulation data to the real-time operational data, and wherein the simulation is deemed valid based on the comparison satisfying a data matching threshold.

6. The system of claim 1, wherein the mass participation event comprises at least one of a concert, a festival, a sporting event, a mass police response, or a convention.

7. The system of claim 1, wherein the participants comprise at least one of spectators, volunteers, event organizers, police responders, or health care responders.

8. A computing device comprising:
one or more processors;
memory storing instructions that, when executed by the one or more processors, cause the computing device to:
use prediction logic to process historical operational data and thereby generate a simulation of physical movement of participants that are physically located at a mass participation event;
receive real-time operational data corresponding to at least the physical movement of the participants during the mass participation event;
based on the simulation and the real-time operational data, verify that the simulation is accurately modeling real-time physical movement of the participants at the mass participation event;
based on verifying the simulation, train the prediction logic using the real-time operational data to obtain refined prediction logic; and
use the refined prediction logic to generate an updated simulation of the physical movement of the participants that are physically located at the mass participation event.

9. The computing device of claim 8, wherein the instructions, when executed by the one or more processors, further cause the computing device to obtain at least a portion of the real-time operational data from the participants during the mass participation event.

10. The computing device of claim 8, wherein the simulation models at least one of a position of a participant, a speed of a participant, or a status of a participant.

11. The computing device of claim 8, wherein the instructions, when executed by the one or more processors, further cause the computing device to receive at least a portion of the real-time operational data from one or more sensors physically located at the mass participation event.

12. The computing device of claim 8, wherein the instructions, when executed by the one or more processors, further cause the computing device to:
generate, based on the prediction logic, an instruction for at least one of the participants; and
notify a participant of the instruction at least by sending the instruction to a device associated with the participant.

13. The computing device of claim 8, wherein the real-time operational data further corresponds to at least one of weather data, medical data, participant data, course information data, or environment data.

14. The computing device of claim 8, wherein the computing device is further configured to use the prediction logic to process the historical operational data and thereby generate a prediction of where to locate medical supply areas at the mass participation event.

15. A non-transitory computer-readable storage medium comprising computer-executable instructions that, when executed, cause a computing device to:
process historical operational data using prediction logic to generate a simulation of physical movement of participants that are physically located at a mass participation event;
receive real-time operational data corresponding to at least the physical movement of the participants during the mass participation event;
based on the simulation and the real-time operational data, verify that the simulation is accurately modeling real-time physical movement of the participants at the mass participation event;
based on verifying the simulation, train the prediction logic using the real-time operational data to obtain refined prediction logic; and
use the refined prediction logic to generate an updated simulation of the physical movement of the participants that are physically located at the mass participation event.

16. The non-transitory computer readable medium of claim 15, wherein the instructions, when executed, further cause the computing device to train the prediction logic at least by adjusting one or more parameters of at least one function that models the physical movement of the participants at the mass participation event.

17. The non-transitory computer readable medium of claim 16, wherein the at least one function comprises at least one of a participant density function, a participant speed function, or a participant tracking function.

18. The non-transitory computer readable medium of claim 15, wherein the instructions, when executed, further cause the computing device to generate a graphical user interface to display event prediction analytics indicating predictions of the physical movement of the participants at the mass participation event.

19. The non-transitory computer readable medium of claim 15, wherein the instructions, when executed, further cause the computing device to receive the real-time operational data from one or more sensors that are physically located at the mass participation event.

20. The non-transitory computer readable medium of claim 15, wherein the mass participation event comprises at least one of a concert, a festival, a sporting event, a mass police response, or a convention.

\* \* \* \* \*